United States Patent
Yano et al.

[11] Patent Number: 6,057,057
[45] Date of Patent: May 2, 2000

[54] CONDUCTIVE AGENT AND NON-SINTERED NICKEL ELECTRODE FOR ALKALINE STORAGE BATTERIES

[75] Inventors: Mutsumi Yano; Mitsuzo Nogami; Katsuhiko Shinyama, all of Osaka; Masao Inoue, Tokushima; Hiroshi Watanabe, Osaka; Reizo Maeda, Osaka; Ikuo Yonezu, Osaka; Koji Nishio, Osaka, all of Japan

[73] Assignee: Sanyo Electric Co., Ltd., Osaka, Japan

[21] Appl. No.: 08/796,541

[22] Filed: Feb. 6, 1997

[30] Foreign Application Priority Data

| Feb. 7, 1996 | [JP] | Japan | 8-046575 |
| Feb. 7, 1996 | [JP] | Japan | 8-046576 |

[51] Int. Cl.⁷ ............................................ H01M 4/52
[52] U.S. Cl. ...................... 429/223; 429/206; 429/218.1
[58] Field of Search ............................... 429/223, 218.1, 429/206

[56] References Cited

U.S. PATENT DOCUMENTS

| 777,417 | 9/1904 | Winkler . | |
| 4,546,058 | 10/1985 | Charkey et al. . | |
| 5,523,182 | 6/1996 | Oushinsky et al. | 429/223 |
| 5,620,813 | 4/1997 | Lee et al. | 429/223 |
| 5,660,952 | 8/1997 | Yano et al. | 429/223 |
| 5,688,616 | 11/1997 | Yamawaki et al. | 429/223 |
| 5,759,718 | 6/1998 | Yao et al. | 429/223 |

FOREIGN PATENT DOCUMENTS

| 716462 A1 | 6/1996 | European Pat. Off. . |
| 752726 A2 | 1/1997 | European Pat. Off. . |
| 757395 A1 | 2/1997 | European Pat. Off. . |
| 60-195024 | 10/1985 | Japan . |
| 61-74261 | 4/1986 | Japan . |
| 62-234867 | 10/1987 | Japan . |
| 1-200555 | 8/1989 | Japan . |
| 3-078965 | 4/1991 | Japan . |
| 7-211316 | 8/1995 | Japan . |

*Primary Examiner*—John S. Maples
*Attorney, Agent, or Firm*—Birch, Stewart, Kolasch & Birch, LLP

[57] ABSTRACT

A conductive agent for use in alkaline storage batteries in accordance with one aspect of the present invention contains 0.1 to 10% by weight sodium. This sodium content results from cobalt or a cobalt compound, to which an aqueous solution of sodium hydroxide is added and heated to 50 to 200° C. A non-sintered nickel electrode for use in alkaline storage batteries is also proposed. In this electrode, the aforesaid conductive agent in accordance with the present invention is added to a pulverulent active material consisting of grains of nickel hydroxide or grains mainly constituted by nickel hydroxide such that 1 to 20 parts by weight of the conductive agent is added to 100 parts by weight nickel hydroxide contained in the pulverulent active material. Another non-sintered nickel electrode for use in alkaline storage batteries is also proposed. In this electrode, an active material takes the form of composite particles consisting of grains of nickel hydroxide or grains mainly constituted by nickel hydroxide, each of which has a surface formed with an electric conduction layer consisting of a cobalt compound containing 0.1 to 10% by weight sodium.

11 Claims, 6 Drawing Sheets

CONDUCTIVE AGENT AND NON-SINTERED NICKEL ELECTRODE FOR ALKALINE STORAGE BATTERIES

FIELD OF THE INVENTION

This invention relates to a conductive agent and a non-sintered nickel electrode for use in alkaline storage batteries.

BACKGROUND OF THE INVENTION

This application claims the Paris convention priorities of Japanese Patent Applications Nos. 8-46575 and 8-46576 both filed on Feb. 7, 1996.

It is known to use a sintered nickel electrode as the nickel electrode of an alkaline storage battery such as an Ni—Cd battery or a nickel-hydrogen battery. For the purpose of making this electrode, it is well known that nickel powder is sintered on the surfaces of a substrate made of a porous steel plate and then this substrate is impregnated with an active material (e.g. nickel hydroxide).

In order to improve the bulk density of an active material used in a sintered nickel electrode, it is necessary to use a highly porous sintered substrate. However, a highly porous sintered substrate has a disadvantage that it is apt to allow the nickel powder to fall off therefrom because of a weak bond between nickel grains resulting from sintering. In order to prevent the nickel powder from falling off from the highly porous sintered substrate, it is most common to make the porosity of the sintered substrate lower than 80%. However, the porosity of the sintered substrate lower than 80% prevents the active material from having a bulk density which is large enough to be adapted for use in a sintered nickel electrode. The highly porous sintered substrate has another disadvantage that a cumbersome process of impregnation has to be repeated several times by an infiltration method for filling the substrate (i.e. a sintered compact) with the active material. This is because a sintered compact obtained from nickel powder usually has a pore size smaller than 10 µm.

A non-sintered nickel electrode has been recently proposed for the purpose of eliminating these disadvantages, where the electrode is made by directly filling a highly porous substrate (such as a foamed metal plated with an alkali-proof metal) with an active material (e.g. nickel hydroxide) fluxed with a solution of a binding agent (e.g. an aqueous solution of methyl cellulose). Since a highly porous substrate (having a porosity of 95% or more) can be used for the non-sintered nickel electrode, the active material is allowed to have a large bulk density and only a single process is enough to fill the substrate with the active material.

However, the highly porous substrate used for the improved bulk density of the active material in the non-sintered nickel electrode is accompanied by a lower electric conductivity and a lower availability of the active material resulting from a lower current collecting capacity than a sintered substrate used in a sintered nickel electrode.

For the purpose of improving the electric conductivity of the non-sintered nickel electrode, it has been proposed that cobalt hydroxide powder (as disclosed in Japanese Laid Open Patent Application No. 61-74261) or graphite powder (as disclosed in Japanese Laid Open Patent Application No. 7-211316) should be added to nickel hydroxide powder.

However, a study made by the present inventors has revealed that, even if cobalt hydroxide powder or graphite powder is added to an active material, it is difficult to obtain a non-sintered nickel electrode in which the utilization of active material is sufficiently high, i.e. in which the active material is made available in a sufficiently high degree.

For the purpose of improving the electric conductivity of the non-sintered nickel electrode, it has also been proposed that the active material should take the form of composite particles consisting of grains of nickel hydroxide coated with cobalt hydroxide (as disclosed in Japanese Laid Open Patent Application No. 62-234867) or those consisting of grains mainly constituted by nickel hydroxide and coated with cobalt oxyhydroxide (as disclosed in Japanese Laid Open Patent Application No. 3-78965).

However, another study made by inventors has revealed that, even with such an improvement in the active material, it is difficult to obtain a non-sintered nickel electrode in which the utilization of active material is sufficiently high.

SUMMARY OF THE INVENTION

Accordingly, a principal object of this invention is to provide a conductive agent having a high electric conductivity and a non-sintered nickel electrode in which the utilization of active material is high, both the conductive agent and the non-sintered nickel electrode being intended for use in alkaline storage batteries.

The present invention provides a conductive agent for alkaline storage batteries characterized in:

that an aqueous solution of sodium hydroxide is added to cobalt or a cobalt compound;

that a mixture of said aqueous solution of sodium hydroxide and said cobalt or said cobalt compound is heated to a temperature falling within a range between 50° C. and 200° C. ; and that said adding and said heating steps are such that a conductive agent containing 0.1 to 10% by weight sodium results therefrom.

The present invention also provides a non-sintered nickel electrode for alkaline storage batteries characterized in:

that an aqueous solution of sodium hydroxide is added to cobalt or a cobalt compound;

that a mixture of said aqueous solution of sodium hydroxide and said cobalt or said cobalt compound is heated to a temperature falling within a range between 50° C. and 200° C.;

that said adding and said heating steps are such that a conductive agent containing 0.1 to 10% by weight sodium results therefrom; and that said conductive agent is added to a pulverulent active material consisting of grains of nickel hydroxide or grains mainly constituted by nickel hydroxide such that 1 to 20 parts by weight of said conductive agent is added to 100 parts by weight nickel hydroxide contained in said pulverulent active material.

The present invention further provides a non-sintered nickel electrode for alkaline storage batteries comprising:

a pulverulent active material in the form of composite particles consisting of grains of nickel hydroxide or grains mainly constituted by nickel hydroxide; and each of said grains having a surface formed with an electric conduction layer consisting of a cobalt compound containing 0.1 to 10% by weight sodium.

BRIEF DESCRIPTION OF THE DRAWINGS

A more complete appreciation and many of the attendant advantages thereof will be readily obtained as the same become better understood by reference to the following detailed description when considered in connection with the accompanying drawings wherein.

DETAILED DESCRIPTION OF THE PREFERRED EMBODIMENTS

A conductive agent for use in alkaline storage batteries in accordance with one aspect of the present invention contains 0.1 to 10% by weight sodium. This sodium content results from cobalt or a cobalt compound, to which an aqueous solution of sodium hydroxide is added and heated to 50 to 200° C.

The sodium content of the conductive agent in accordance with the present invention falls within the range between 0.1 and 10% by weight. If the sodium content does not fall within this range, it is impossible to obtain a conductive agent having a sufficiently high electric conductivity.

The cobalt compound suitable for use in this conductive agent is cobalt hydroxide and cobalt oxide.

The chemical structure of the conductive agent in accordance with the present invention has not been established yet. In view of the fact that it has an extremely high electric conductivity, it is inferred that it is not a mere mixture of sodium and a cobalt compound (such as cobalt oxyhydroxide) but a cobalt compound having a particular crystalline structure of which a sodium atom or atoms are components.

Temperatures suitable for heating the materials for the conductive agent in accordance with the present invention range between 50 and 200° C. At temperatures above or below this temperature range, it is impossible to obtain a conductive agent having a high electric conductivity. A conceivable reason therefor will be described hereinafter.

When cobalt hydroxide is used as an initial material, the reaction path to be followed by the conductive agent in accordance with the present invention is as follows:

containing Na (corresponding to the conductive agent in accordance with the present invention)

An explanation for the difficulty in obtaining a sufficient amount of a conductive agent having a high electric conductivity at temperatures above or below the aforesaid temperature range between 50 and 200° C. may possibly be provided by the following: When the materials are heated at temperatures below 50° C., it is difficult to allow the final stage (i.e. $CoHO_2 \rightarrow$ cobalt compound containing Na) of the aforesaid reaction to proceed sufficiently. The result is that a large amount of $CoHO_2$, which has a lower electric conductivity than the cobalt compound containing Na, is produced. When the materials are heated at temperatures above 200° C., a large amount of tricobalt tetroxide ($Co_3O_4$) having a low electric conductivity is produced.

Normally it takes 0.5 to 10 hours for the conductive agent in accordance with the present invention to be heated for production, although the time required for heating the same varies with the amount and concentration of the aqueous solution of sodium hydroxide and with the temperature at which the aqueous solution of sodium hydroxide is heated.

According to another aspect of the invention, there is provided a non-sintered nickel electrode for use in alkaline storage batteries (hereinafter referred to as a "first electrode"), in which the aforesaid conductive agent in accordance with the present invention is added to a pulverulent active material consisting of grains of nickel hydroxide or grains mainly constituted by nickel hydroxide such that 1 to 20 parts by weight of the conductive agent is added to 100 parts by weight nickel hydroxide contained in the pulverulent active material. When the amount of the conductive agent added is less than 1 part by weight, it is impossible to obtain a non-sintered nickel electrode in which the utilization of active material is sufficiently high. When the amount of the conductive agent added is greater than 20 parts by weight, a low electrode capacity results from a small amount of nickel hydroxide with which the non-sintered nickel electrode is barely filled.

Grains mainly constituted by nickel hydroxide preferably take the form of a solid solution of a foreign element or elements in nickel hydroxide. Cobalt, zinc, cadmium, calcium, manganese and magnesium, which have an inhibitory action against the swelling of the nickel electrode, may be suitable for use as the aforesaid foreign element or elements.

According to still another aspect of the invention, there is provided a non-sintered nickel electrode for use in alkaline storage batteries (hereinafter referred to as a "second electrode"), which also utilizes an active material in the form of composite particles consisting of grains of nickel hydroxide or grains mainly constituted by nickel hydroxide, each of which has a surface formed with an electric conduction layer consisting of a cobalt compound containing 0.1 to 10% by weight sodium.

Grains mainly constituted by nickel hydroxide preferably take the form of a solid solution of a foreign element or elements in nickel hydroxide. Cobalt, zinc, cadmium, calcium, manganese and magnesium, which have an inhibitory action against the swelling of the nickel electrode, may be suitable for use as the aforesaid foreign element or elements.

The chemical structure of the cobalt compound containing Na, of which the electric conduction layer consists, has not been established yet. In view of the fact that the pulverulent active material used in the second electrode has a high specific electric conductivity, it is inferred that it is not a mere mixture of sodium and a cobalt compound (such as cobalt oxyhydroxide) but a cobalt compound having a particular crystalline structure of which a sodium atom or atoms are components.

The pulverulent active material to be used in the second electrode can, e.g., be produced by adding an aqueous solution of sodium hydroxide to composite particles consisting of grains of nickel hydroxide or grains mainly constituted by nickel hydroxide, each of which has a surface formed with a cobalt compound layer, by heating the mixture to 50 to 200° C. The cobalt compound layer can, e.g., be formed by pouring nickel hydroxide powder or particulate matter mainly constituted by nickel hydroxide into an aqueous solution of cobalt sulfate, by adding an aqueous solution of sodium hydroxide, and by precipitating a cobalt compound on the surfaces of grains of nickel hydroxide or grains mainly constituted by nickel hydroxide. Alternatively, a mechanical charging method may be used for forming the cobalt compound layer on the surfaces of nickel hydroxide powder or particulate matter mainly constituted by nickel hydroxide, this method being characterized in that cobalt oxide, cobalt hydroxide or cobalt as a simple substance is fluxed with nickel hydroxide powder or particulate matter mainly constituted by nickel hydroxide. While the aforesaid composite particles may be replaced by a mixture of grains of nickel hydroxide or the particulate matter mainly constituted by nickel hydroxide and the powder of cobalt hydroxide, cobalt monoxide or cobalt as a simple substance, this mixture makes it difficult to form the electric conduction layer, and the method using this mixture is inferior both to the first mentioned method and to the alternative method. The reason for heating the mixture to 50 to 200° C. is that, at temperatures above or below this temperature range, it is difficult to form an electric conduction layer having a high electric conductivity as is the case with the aforesaid conductive agent in accordance with the present invention. Likewise, as is the case with the aforesaid conductive agent in accordance with the present invention, it normally takes 0.5 to 10 hours for the mixture used in the first mentioned method to be heated for the production of the pulverulent active material to be used in the second electrode, although the time required for heating the same varies with the amount and concentration of the aqueous solution of sodium hydroxide and with the temperature at which the aqueous solution of sodium hydroxide is heated.

The sodium content of the cobalt compound containing sodium is confined in a range between 0.1 and 10% by weight. If the sodium content does not fall in this range, it is impossible to form an electric conduction layer having a sufficiently high electric conductivity, nor is it possible to obtain a non-sintered nickel electrode in which the utilization of active material is sufficiently high.

The active material utilized in the present invention in the form of composite particles should preferably contain 1 to 10% by weight cobalt compound containing sodium, this percentage by weight being expressed in terms of cobalt atoms. Then this percentage is less than 1% by weight, an insufficient electrode capacity results from an insufficient degree of improvement in the electric conductivity of the active material. When the aforesaid percentage is greater than 10% by weight, a likewise insufficient electrode capacity results from a small amount of nickel hydroxide used as an active material.

Powder suitable for use as the active material to be utilized in the present invention may be the one having a mean diameter of 3 to 20 μm and a specific electric conductivity of $1 \times 10^{-5}$ $\Omega^{-1} \cdot cm^{-1}$ or more under the condition that a pressure of 400 kgf/cm² is applied thereto.

When the specific electric conductivity is less than $1 \times 10^{-5}$ $\Omega^{-1} \cdot cm^{-1}$, it is difficult to obtain a non-sintered nickel electrode in which the utilization of active material is sufficiently high. On the other hand, a low electrode capacity results from the mean diameter of the powder failing to fall in the range between 3 to 20μm. The probable reason for the low electrode capacity caused by a mean diameter of the powder failing to fall in the aforesaid range is that the powder is secondarily coagulated to the extent of making it difficult to fill the non-sintered nickel electrode with the powder. The reason for the low electrode capacity caused by a mean diameter of the powder exceeding 20 μm is that a small area of contact of the active material in the form of grains results in a low utilization of active material.

EXAMPLES

Example 1

In this Example, the relationship between the kinds of conductive agents and the utilizations of active materials in non-sintered nickel electrodes was sought.

Preparation of conductive agent

Cobalt hydroxide and 25% by weight aqueous sodium hydroxide solution were mixed with each other in 1:10 ratio by weight. The mixture was heated to 80° C., allowed to stand for 8 hours at this temperature, washed with water, and dried at 60° C. A cobalt compound containing sodium was thus prepared. This cobalt compound was a conductive agent in accordance with the present invention, the sodium content of which was measured by an atomic absorption method and was found to be 1% by weight.

Preparation of non-sintered nickel electrode

In order to prepare the aforesaid first electrode in accordance with another aspect of the invention, 100 parts by weight of an active material consisting of nickel hydroxide and 10 parts by weight of a conductive agent consisting of the aforesaid cobalt compound containing sodium were fluxed with 20 parts by weight of a binding agent consisting of 1% by weight aqueous methyl cellulose solution. A porous substrate consisting of a foamed metal plated with nickel (having a porosity of 95% and a mean diameter of 200μm) was filled with paste obtained from the aforesaid fluxing process. Then the paste was dried and subjected to compression molding.

Preparation of alkaline storage batteries

An alkaline storage battery A1 was prepared, which consisted of the aforesaid non-sintered nickel electrode (as a positive electrode), a prior art pasted plate made up of cadmium (as a negative electrode) having a higher electrochemical capacity than the positive electrode, a non-woven web of polyamide fibers (as a separator), a 30% by weight aqueous potassium hydroxide solution (as an alkaline electrolyte), a metal housing and a metal cover.

Alkaline storage batteries A2 and A3 were also prepared, which differed from the battery A1 by the facts that the conductive agent used in the battery A2 was 10 parts by weight of cobalt hydroxide in place of 10 parts by weight of the aforesaid cobalt compound containing sodium and that the conductive agent used in the battery A3 was 10 parts by weight of graphite in place of 10 parts by weight of the aforesaid cobalt compound containing sodium.

Utilization of active material in each of the non-sintered nickel electrodes

Ten cycles of charge and discharge were carried out, wherein a cycle consisted of a charging process in which each of the batteries A1 to A3 was charged to the extent of 160% at 25° C. and with 0.1° C. and a subsequent discharging process in which each of the batteries A1 to A3 was discharged at 25° C. and with 1° C. to such an extent that the terminal voltage dropped to 1.0V. The utilization of active material in each of the positive electrodes was found at the tenth cycle, it being as defined by the following formula:

$$D = \{B/C \times 288(mAh)\} \times 100$$

where
- D=utilization of active material in each of the positive electrodes, %
- B=milliampere-hours capacity of each of the positive electrodes at the discharging process of the tenth cycle, mAh
- C=amount of nickel hydroxide, g The results are given in Table I wherein the utilizations of active materials in the respective positive electrodes are indicated on the premise that the value of D found with respect to the positive electrode of the battery A1 was 100.

TABLE I

| Alkaline storage battery | Conductive agent | D |
|---|---|---|
| A1 | Cobalt compound containing sodium | 100 |
| A2 | Cobalt hydroxide | 95 |
| A3 | Graphite | 87 |

Table I indicates that the utilizations of active materials in the positive electrodes of the batteries A2 and A3 were lower than that in the positive electrode of the battery A1. This means that the conductive agent in accordance with the present invention (which takes the form of a cobalt compound containing sodium) has a remarkably higher electric conductivity than cobalt hydroxide or graphite. It was further found that a high electric conductivity could be likewise obtained when a cobalt compound containing sodium was made from cobalt as a simple substance or cobalt oxide instead of being made from cobalt hydroxide.

Example 2

In this Example, the relationship between the sodium contents of the cobalt compound containing sodium and the utilizations of active materials in non-sintered nickel electrodes was sought.

This Example differed from Example 1 by the fact that, in preparing cobalt compounds having various sodium contents, 25% by weight aqueous sodium hydroxide solution used in Example 1 was replaced by 5, 10, 15, 35, 40, 45 and ASH 50% by weight aqueous sodium hydroxide solutions. The sodium contents of these cobalt compounds were measured by an atomic absorption method and were found to be 0.05, 0.1, 0.5, 5, 10, 12 and 15% by weight respectively. Alkaline storage batteries A4 to A10 were prepared in a manner similar to those in Example 1 except that the aforesaid cobalt compounds containing sodium were used.

Figure 1:
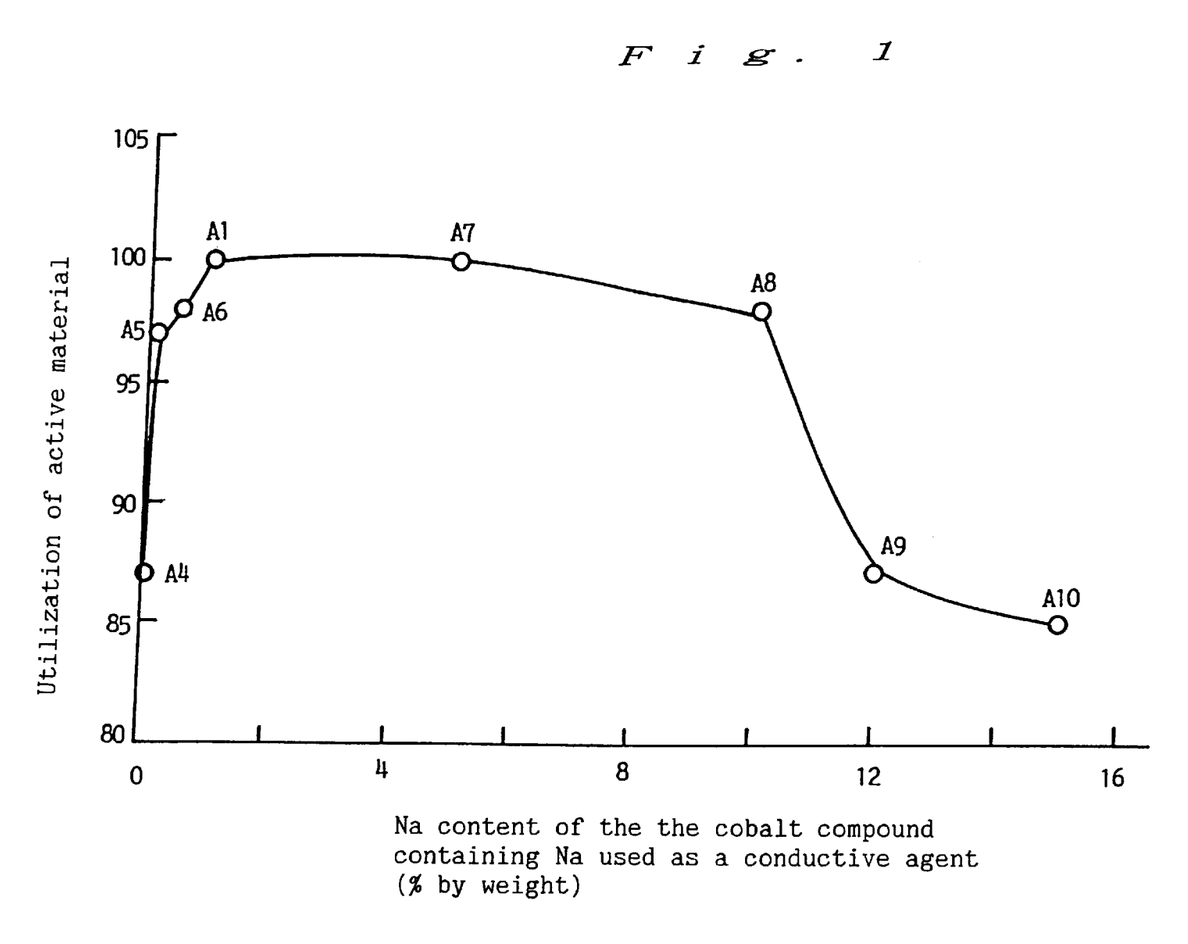
FIG. 1 is a curve of the utilization of active material in a non-sintered nickel electrode plotted against the sodium content of a cobalt compound containing sodium.

Then the batteries A4 to A10 were subjected to 10 cycles of charge and discharge in the same manner as described in Example 1. A utilization of active material in each of the electrodes was found at the tenth cycle, and the relationship between the sodium contents of the cobalt compound containing sodium and the utilization of active material was sought. The results are given in FIG. 1. The utilizations of active materials in the respective positive electrodes are plotted in FIG. 1 on an ordinate against the sodium contents of a cobalt compound containing sodium on an abscissa. FIG. 1 further includes data on the battery A1 obtained from Example 1. On the ordinate of FIG. 1, the utilizations of active materials in the respective positive electrodes are indicated on the premise that the value of D found with respect to the positive electrode of the battery A1 was 100.

It is noted from FIG. 1 that, in view of the fact that the utilizations of active materials in the batteries A1 and A5 to A8 are especially high, the cobalt compound (used as a conductive agent in accordance with the present invention) has an especially high electric conductivity when it contains 0.1 to 10% by weight sodium.

Example 3

In this Example, the relationships between the utilizations of active materials in non-sintered nickel electrodes and the amounts of the cobalt compound (used as a conductive agent in accordance with the present invention) added to nickel hydroxide and between the electrode capacity and the aforesaid amounts of the cobalt compound were sought.

This Example differed from Example 1 by the fact that, in preparing non-sintered nickel electrodes, 10 parts by weight cobalt compound containing sodium (used as a conductive agent in accordance with the present invention) added to 100 parts by weight nickel hydroxide was replaced by 0.5, 1, 5, 15, 20, 22.5 and 25 parts by weight cobalt compound containing 1% by weight sodium. Alkaline storage batteries A11 to A17 were prepared in a manner similar to those in Example 1 except that the aforesaid non-sintered nickel electrodes were used.

Then the batteries A11 to A17 were subjected to 10 cycles of charge and discharge in the same manner as described in Example 1. A utilization of active material in each of the electrodes was found at the tenth cycle, and the relationship between the amounts of the cobalt compound containing sodium added to nickel hydroxide and the utilization of active material was sought. The results are given in Table II, which further includes data on the battery A1 obtained from Example 1.

TABLE II

| Alkaline storage battery | Parts by weight cobalt compound containing sodium added to 100 parts by weight nickel hydroxide | D |
|---|---|---|
| A11 | 0.5 | 80 |
| A12 | 1 | 97 |
| A13 | 5 | 99 |
| A1 | 10 | 100 |
| A14 | 15 | 100 |
| A15 | 20 | 100 |
| A16 | 22.5 | 100 |
| A17 | 25 | 100 |

Table II indicates that more than 1 part by weight cobalt compound containing sodium added to 100 parts by weight nickel hydroxide makes it possible to obtain a non-sintered nickel electrode in which the utilization of active material is high.

Figure 2:
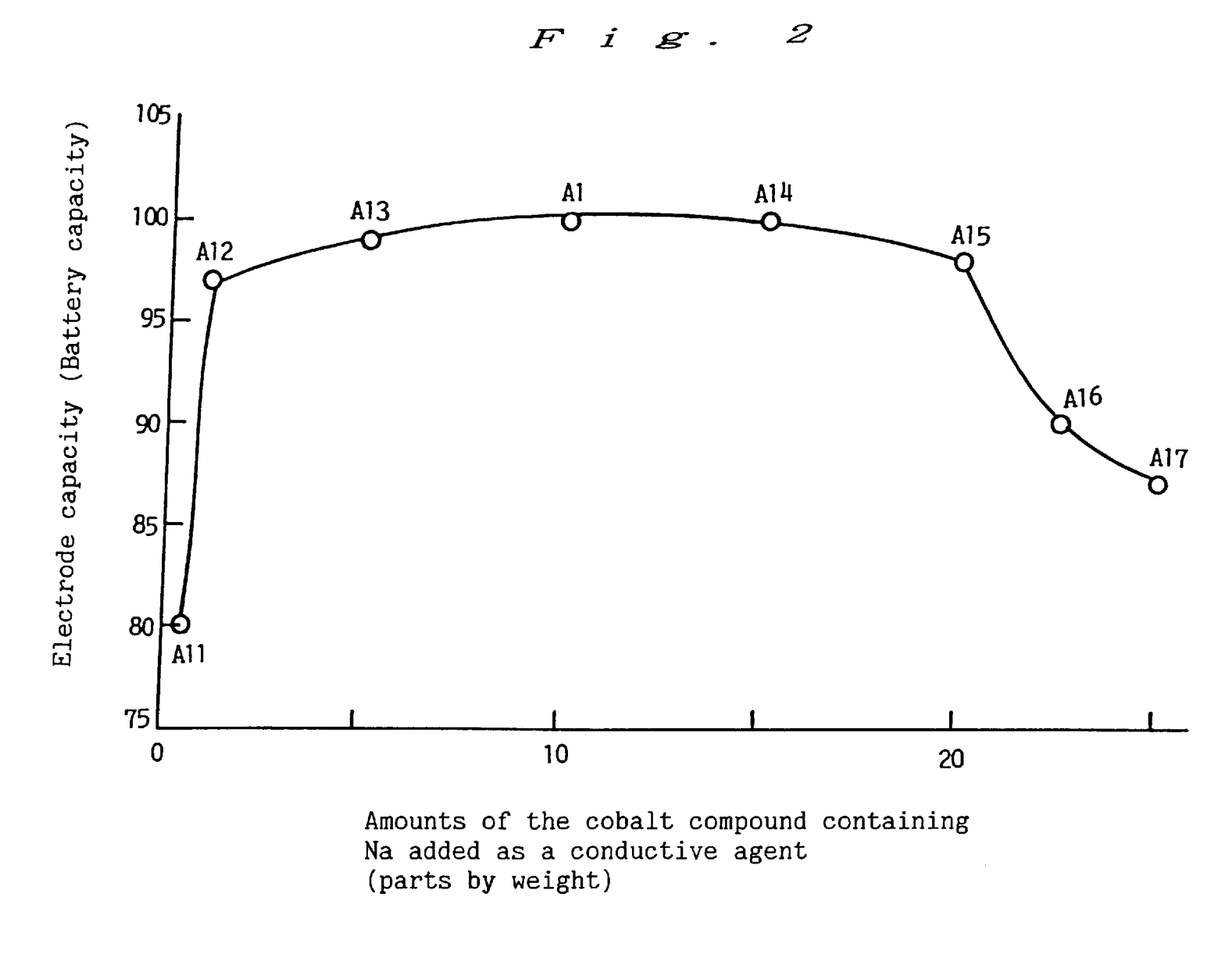
FIG. 2 is a curve of the electrode capacity of the non-sintered nickel electrode plotted against the amount of the cobalt compound containing sodium added to nickel hydroxide.

In FIG. 2, the ampere-hours capacity of each battery is plotted on an ordinate against the amounts of the cobalt compound containing sodium added to nickel hydroxide on an abscissa, on which the amounts of the cobalt compound were expressed in parts by weight added to 100 parts by weight nickel hydroxide. FIG. 2 further includes data on the battery A1 obtained from Example 1. On the ordinate of FIG. 2, the ampere-hours capacities of the batteries are indicated on the premise that the ampere-hours capacity of the battery A1 was 100.

It is noted from FIG. 2 that, in view of the fact that the batteries A1 and A12 to A15 have especially high ampere-hours capacities, the non-sintered nickel electrode (used as an electrode in accordance with the present invention) has an especially high electrode capacity when 1 to 20 parts by weight cobalt compound containing sodium is added to 100 parts by weight nickel hydroxide.

Example 4

In this Example, the relationship between the temperatures at which the cobalt compound containing sodium for use as the conductive agent in accordance with the present invention was heated and the utilization of active material in non-sintered nickel electrodes was sought.

This Example differed from Example 1 by the fact that, in preparing cobalt compounds containing sodium, the mixture of materials was heated to 45° C., 50° C., 60° C., 100° C., 150° C. . 200° C., 220° C. and 250° C. instead of being heated to 80° C. The sodium contents of these cobalt compounds were measured by an atomic absorption method and were found to be 0.05, 1, 1, 1, 1, 1, 0.05 and 0.02% by weight respectively. Alkaline storage batteries A18 to A25 were prepared in a manner similar to those in Example 1 except that the aforesaid cobalt compounds containing sodium were used.

Figure 3:
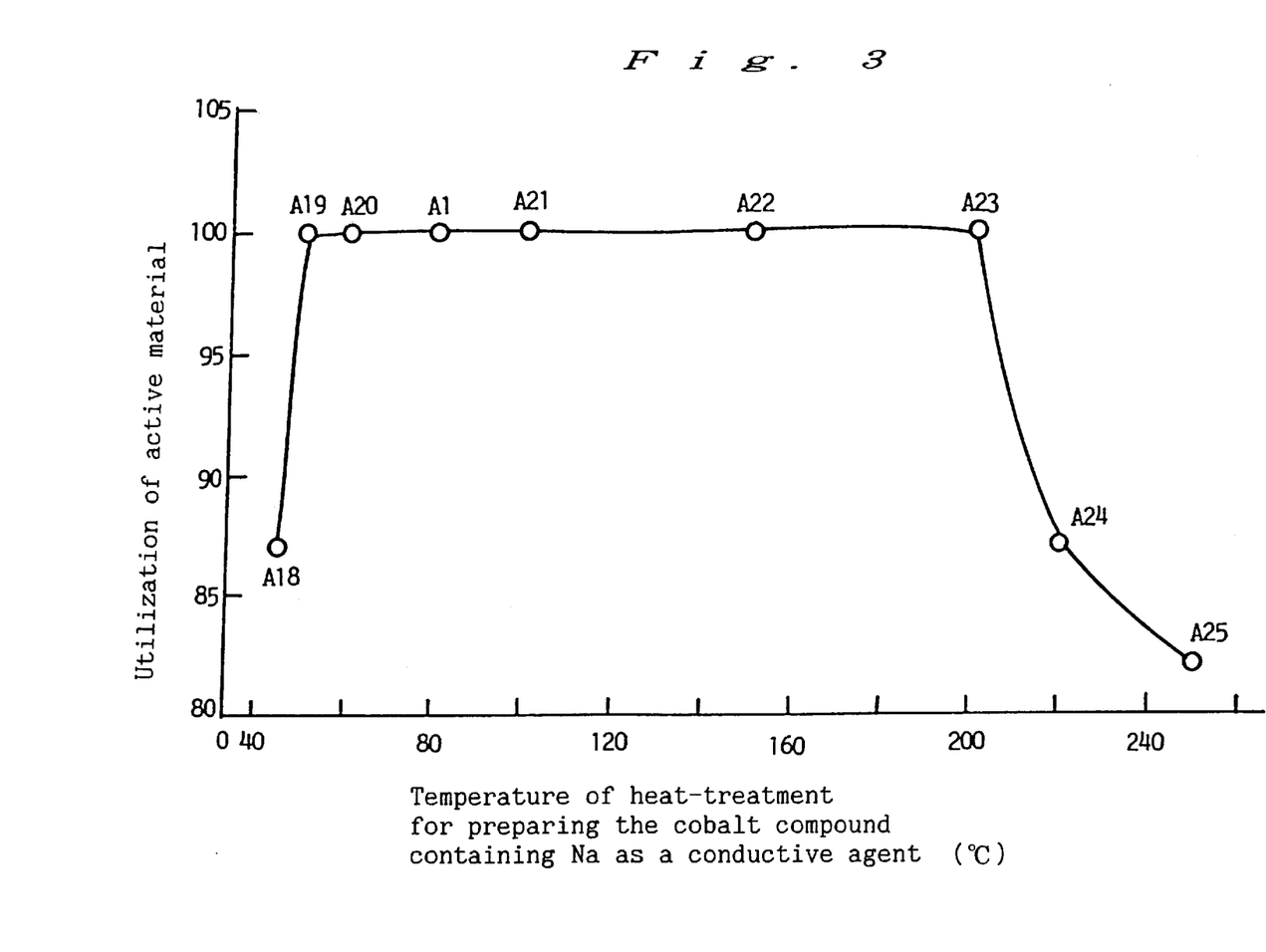
FIG. 3 is a curve of the utilization of active material in a non-sintered nickel electrode plotted against temperatures required for a heating process in producing the cobalt compound containing sodium.

Then the batteries A18 to A25 were subjected to 10 cycles of charge and discharge in the same manner as described in Example 1. A utilization of active material in each of the positive electrodes was found at the tenth cycle, and the relationship between the temperatures at which the cobalt compound containing sodium for use as the conductive agent in accordance with the present invention were heated and the utilization of active material was sought. The results are given in FIG. 3. The utilizations of active materials in the respective positive electrodes are plotted in FIG. 3 on an ordinate against the aforesaid temperatures (° C.) on an abscissa. FIG. 3 further includes data on the battery A1 obtained from Example 1. On the ordinate of FIG. 3, the utilizations of active materials in the respective positive electrodes are indicated on the premise that the value of D found with respect to the positive electrode of the battery A1 was 100.

It is noted from FIG. 3 that, in view of the fact that the utilizations of active materials in the batteries A1 and A19 to A23 are especially high, the cobalt compound (used as a conductive agent in accordance with the present invention) has an especially high electric conductivity when the mixture of materials is heated to 50 to 200° C.

It was found that, in order to obtain a non-sintered nickel electrode in which the utilization of active material is high, nickel hydroxide per se used as the active material in the aforesaid Examples may be replaced by a solid solution of cobalt, zinc, cadmium, calcium, manganese or magnesium in nickel hydroxide under the condition that a prescribed amount of the conductive agent in accordance with the present invention is added thereto.

Example 5

In this Example, the relationship between the kinds of electric conduction layers formed on the surfaces of grains of an active material and the utilizations of active materials in non-sintered nickel electrodes was sought.

Preliminary test

Cobalt hydroxide was mixed with 5, 10, 15, 25, 35, 40, 45 and 50% by weight aqueous sodium hydroxide solutions respectively in 1:10 ratio by weight. The mixtures were heated to 80° C., allowed to stand for 8 hours at this temperature, washed with water, and dried at 60° C. Cobalt compounds containing sodium were thus prepared, the sodium contents of which were measured by an atomic absorption method and were found to be 0.05, 0.1, 0.5, 1, 5, 10, 12 and 15% by weight respectively. Various sodium contents of cobalt compounds containing sodium which will appear hereinafter are estimated values based on the results of the aforesaid preliminary test and on the concentrations of aqueous sodium hydroxide solutions used.

Preparation of non-sintered nickel electrode

To 1,000 ml aqueous cobalt sulfate solution containing 13.1 g of cobalt sulfate, 100 g nickel hydroxide powder were added. Then, while this solution was stirred, 1 M aqueous sodium hydroxide solution was admitted until the pH of the first mentioned solution assumed a value of 11. The solution continued to be stirred. Then the pH of the solution slightly decreased, an appropriate amount of 1 M aqueous sodium hydroxide solution was further admitted so that the pH of the first mentioned solution might be maintained at 11. The reaction was allowed to proceed for an hour. A glass electrode adapted for automatic focusing was used for monitoring the pH. Then the precipitate was filtered and washed with water. Powder obtained therefrom was in the form of composite particles consisting of grains of nickel hydroxide, each of which had a surface coated with cobalt hydroxide. This powder was mixed with 25% by weight aqueous sodium hydroxide solution in 1:10 ratio by weight. The mixture was heated to 80° C., allowed to stand for 8 hours at this temperature, washed with water, and dried at 60° C. A pulverulent active material obtained therefrom was in the form of composite particles consisting of grains of nickel hydroxide, each of which had a surface formed with an electric conduction layer consisting of a cobalt compound containing sodium. The cobalt compound content of these composite particles was measured by an atomic absorption method and was found to be 5% by weight in terms of cobalt atoms. The sodium content of the cobalt compound was assumed to be 1% by weight (on the basis of the results of the aforesaid preliminary test).

In order to prepare the aforesaid second electrode X1 in accordance with still another aspect of the invention, 100 parts by weight of the aforesaid pulverulent active material (having a mean diameter of 10 $\mu$m) was fluxed with 20 parts by weight of a binding agent consisting of 1% by weight aqueous methyl cellulose solution. A foamed metal plated with nickel (having a porosity of 95% and a mean diameter of 200 $\mu$m) was filled with paste obtained from the aforesaid fluxing process. Then the paste was dried and subjected to compression molding.

Another non-sintered nickel electrode Y1 (to be used as a control electrode) was prepared in a manner similar to the preparation of the aforesaid second electrode X1 except that 8% by weight aqueous lithium hydroxide solution (saturated) was used in place of 25% by weight aqueous sodium hydroxide solution in obtaining the pulverulent active material.

Still another non-sintered nickel electrode Y2 (to be used as a control electrode) was prepared in a manner similar to the preparation of the aforesaid second electrode X1 except that 25% by weight aqueous potassium hydroxide solution was used in place of 25% by weight aqueous sodium hydroxide solution in obtaining the pulverulent active material.

Yet still another non-sintered nickel electrode Y3 (to be used as a control electrode) was prepared in a manner similar to the preparation of the aforesaid second electrode X1 except that the powder obtained in the form of composite particles during the course of obtaining the pulverulent active material for the preparation of the second electrode X1 was used, without further treatment, as a pulverulent active material for the preparation of this electrode Y3.

Further non-sintered nickel electrode Y4 (to be used as a control electrode) was prepared in a manner similar to the preparation of the aforesaid second electrode X1 except that the pulverulent active material used was different from that used in the second electrode X1 by the fact that the aforesaid powder obtained in the form of composite particles was allowed to react on 30% by weight aqueous hydrogen peroxide solution heated to 40° C. so that cobalt hydroxide formed on the surface of each particle might be oxidized and converted into β-CoOOH.

Preparation of Ni—Cd battery

Alkaline storage batteries of the size AA were prepared, each of which included each of the aforesaid non-sintered nickel electrodes (as a positive electrode), a prior art pasted plate made up of cadmium (as a negative electrode) having a higher electrochemical capacity than the positive electrode, a non-woven web of polyamide fibers (as a separator), and a 30% by weight aqueous potassium hydroxide solution (as an alkaline electrolyte).

Specific electric conductivity κ of each pulverulent active material

Figure 4:
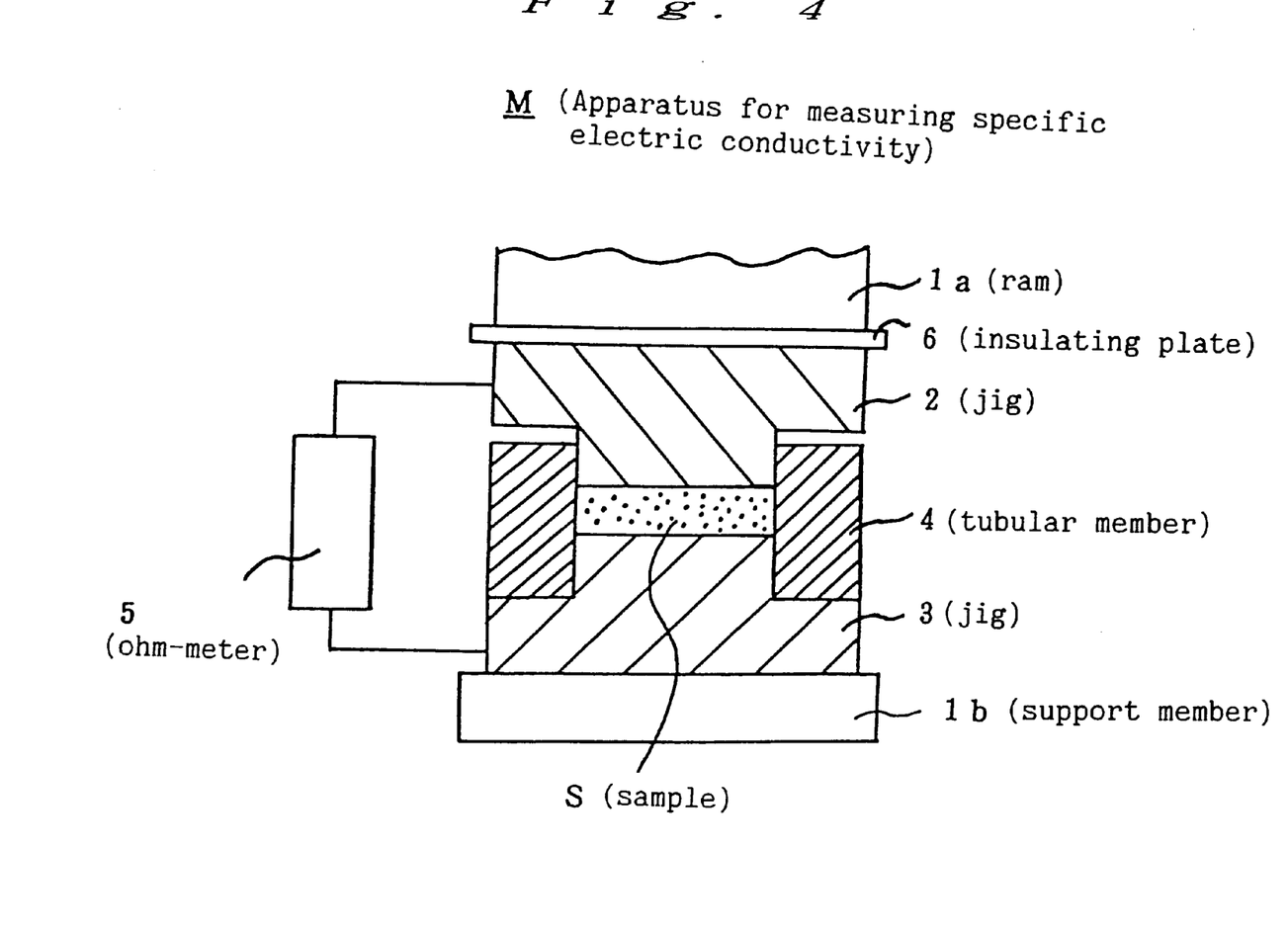
FIG. 4 is a fragmentary sectional view of a means for measuring specific electric conductivity.

The specific electric conductivities κ of the pulverulent active materials used respectively for the second electrode X1 and the control electrodes Y1 to Y4 were measured. FIG. 4 is a fragmentary sectional view of an apparatus M used for measuring the same. The apparatus M includes a ram 1a positioned adjacent to the upper surface of a support member 1b and reciprocatable normal thereto so as to press jigs 2 and 3, each of which is a disk-like plate having a cylindrical portion of lesser diameter protruding therefrom so as to be of substantially T-shaped cross-section. A tubular member 4 lined with a layer of an insulating material is interposed between the jigs 2 and 3. The apparatus M further includes an ohm-meter 5 and an insulating plate 6. The lower end of the tubular member 4 abuts against the peripheral flange portion of the jig 3. The inner cylindrical surface of the tubular member 4 and the upper and lower surfaces of the cylindrical portions of the jigs 3 and 2 respectively form a cavity in which a sample S (in the form of a pulverulent active material) is placed. The cylindrical portion of the jig 2 abuts on the upper part of the inner cylindrical surface of the tubular member 4. The ram 1a and the support member 1b engage the jigs 2 and 3 respectively. Pressure is applied to the sample S at a prescribed intensity through the jigs 2 and 3, to which the ohm-meter 5 is connected and adapted to measure the resistance R of the sample S, for which purpose 1 g of the sample S was placed in the apparatus M and underwent a pressure of 400 kgf/cm². The specific electric conductivities κ calculated in $\Omega^{-1} \cdot cm^{-1}$ from the following formula are given in Table III:

$$\kappa = L/(A \cdot R)$$

where

L=distance from the lower surface of the cylindrical portion of the jig 2 to the upper surface of the cylindrical portion of the jig 3

A=area of the aforesaid upper or lower surface

The pulverulent active material used in the control electrode Y3 had a high resistance R such that it was impossible to find the specific electric conductivity X in the form of a numerical value.

Utilization of active material in each of the non-sintered nickel electrodes

Ten cycles of charge and discharge were carried out, wherein a cycle consisted of a charging process in which each of the batteries was charged to the extent of 160% at 25° C. and with 0.1° C. and a subsequent discharging process in which each of the batteries was discharged at 25° C. and with 1° C. to such an extent that the terminal voltage dropped to 1.0 V. A utilization of active material in each of the non-sintered nickel electrodes was found at the tenth cycle, the utilization of active material being as defined by the following formula:

$$D = \{B/C \times 288(mAh/g)\} \times 100$$

where

D=utilization of active material in each of the non-sintered nickel electrodes, %

B=milliampere-hours capacity of each of the positive electrodes at the discharging process of the tenth cycle, mAh C=amount of nickel hydroxide contained in the pulverulent active material, g The results are given in Table III, wherein the utilizations of active materials in the respective non-sintered nickel electrodes are indicated on the premise that the value of D found with respect to the second electrode X1 was 100.

TABLE III

| Non-sintered nickel electrode | Na content (% by weight) | Co compound content (% by weight) | Mean diameter (μm) | Specific electric conductivity ($\Omega^{-1} \cdot cm^{-1}$) | D |
|---|---|---|---|---|---|
| X1 | 1 | 5 | 10 | $1 \times 10^{-4}$ | 100 |
| Y1 | 0 | 5 | 10 | $1.5 \times 10^{-5}$ | 94 |
| Y2 | 0 | 5 | 10 | $2.0 \times 10^{-5}$ | 95 |
| Y3 | 0 | 5 | 10 | Immeasurable | 86 |
| Y4 | 0 | 5 | 10 | $8 \times 10^{-6}$ | 88 |

Table III indicates that, because of the fact that the pulverulent active material used in the second electrode X1 had a higher specific electric conductivity κ than the pulverulent active materials used in the control electrodes Y1 to Y4, the former was made available in a higher degree than the latter.

Example 6

In this Example, the relationship between the sodium contents of the cobalt compound forming the electric conduction layer and the utilizations of active materials in non-sintered nickel electrodes was sought.

This Example differed from Example 1 by the fact that, in preparing cobalt compounds containing sodium, cobalt hydroxide and 5, 10, 15, 35, 40, 45 or 50% by weight aqueous sodium hydroxide solution were mixed with each other. The sodium contents of the cobalt compounds obtained from this mixture were 0.05, 0.1, 0.5, 5, 10, 12 and 15% by weight. Non-sintered nickel electrodes A to G were prepared in a manner similar to the preparation of the aforesaid second electrode X1 except that the cobalt compounds obtained from the aforesaid mixture were used. Then, alkaline storage batteries incorporating these electrodes a to e and X1 were prepared.

Figure 5:
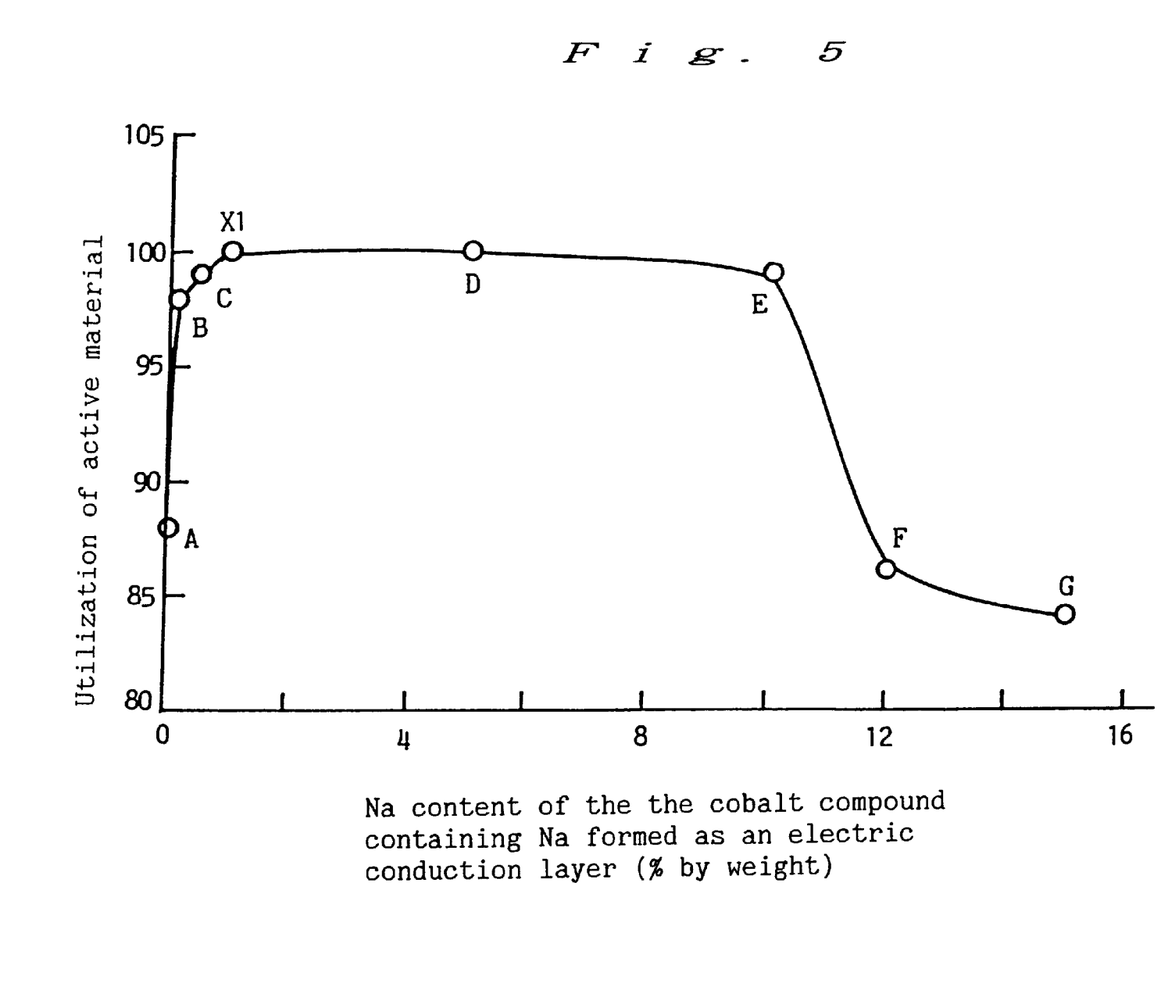
FIG. 5 is a similar view to that shown in FIG. 1 but showing the case where the cobalt compound is applied to an electric conduction layer.

Then the batteries were subjected to 10 cycles of charge and discharge in the same manner as described above. A utilization of active material in each of the non-sintered nickel electrodes was found at the tenth cycle, and the relationship between the sodium contents of the cobalt compound containing sodium and the utilization of active material was found. The results are given in Table IV and FIG. 5. The utilizations of active materials in the respective non-sintered nickel electrodes are plotted in FIG. 5 on an ordinate against the sodium contents of a cobalt compound containing sodium on an abscissa. FIG. 5 further includes data on the second electrode X1 (containing 1% by weight sodium). On the ordinate of FIG. 5, the utilizations of active materials in the respective non-sintered nickel electrodes are indicated on the premise that the value of D found with respect to the second electrode X1 was 100.

contents of the cobalt compounds contained in the pulverulent active materials were adjusted to 1% by weight. Non-sintered nickel electrodes a to e were prepared in a manner similar to the preparation of the aforesaid second electrode X1 except that the aforesaid pulverulent active materials were used. Then, alkaline storage batteries incorporating these electrodes a to e and X1 were prepared.

Then the batteries were subjected to 10 cycles of charge and discharge in the same manner as described above.

A utilization of active material in each of the non-sintered nickel electrodes was found at the tenth cycle, and the relationship between the utilizations of active materials in non-sintered nickel electrodes and the percentages of cobalt compounds contained in the composite particles was sought. The results are given in Table V, which also indicates data on the second electrode X1 (containing 5% by weight cobalt compound). In Table V, the utilizations of active materials in the respective electrodes are indicated on the premise that the value of D found with respect to the second electrode X was 100. 1

TABLE IV

| Non-sintered nickel electrode | Na content (% by weight) | Co compound content (% by weight) | Mean diameter ($\mu$m) | Specific electric conductivity ($\Omega^{-1} \cdot cm^{-1}$) | D |
| --- | --- | --- | --- | --- | --- |
| A | 0.05 | 5 | 10 | $8 \times 10^{-6}$ | 88 |
| B | 0.1 | 5 | 10 | $3 \times 10^{-6}$ | 97 |
| C | 0.5 | 5 | 10 | $8 \times 10^{-5}$ | 99 |
| X1 | 1 | 5 | 10 | $1 \times 10^{-4}$ | 100 |
| D | 5 | 5 | 10 | $1 \times 10^{-3}$ | 100 |
| E | 10 | 5 | 10 | $8 \times 10^{-5}$ | 99 |
| F | 12 | 5 | 10 | $8 \times 10^{-6}$ | 86 |
| G | 15 | 5 | 10 | $8 \times 10^{-6}$ | 84 |

Table IV and FIG. 5 indicate that a cobalt compound (used as an electric conduction layer) containing 0.1 to 10% by weight sodium makes it possible to obtain a non-sintered nickel electrode having an especially high utilization of active material.

Example 7

In this Example, the relationships between the utilizations of active materials in non-sintered nickel electrodes and the percentages of cobalt compounds (used as electric conduction layers) contained in the composite particles and between the electrode capacities and the aforesaid percentages were sought.

In a manner similar to the preparation of the pulverulent active material for the second electrode X1 except that the aqueous cobalt sulfate solution had a different concentration, pulverulent active materials were prepared in the form of composite particles containing 0.5, 1, 10, 12 and 15% by weight cobalt compounds (used as electric conduction layers) respectively in terms of cobalt atoms. The sodium

TABLE V

| Non-sintered nickel electrode | Na content (% by weight) | Co compound content (% by weight) | Mean diameter ($\mu$m) | Specific electric conductivity ($\Omega^{-1} \cdot cm^{-1}$) | D |
| --- | --- | --- | --- | --- | --- |
| a | 1 | 0.5 | 10 | $8 \times 10^{-6}$ | 84 |
| b | 1 | 1 | 10 | $8 \times 10^{-5}$ | 99 |
| X1 | 1 | 5 | 10 | $1 \times 10^{-4}$ | 100 |
| c | 1 | 10 | 10 | $3 \times 10^{-3}$ | 100 |
| d | 1 | 12 | 10 | $4.5 \times 10^{-3}$ | 100 |
| e | 1 | 15 | 10 | $5.5 \times 10^{-3}$ | 100 |

Table V indicates that composite particles containing 1% by weight cobalt compounds make it possible to obtain a non-sintered nickel electrode having a high utilization of active material.

Figure 6:
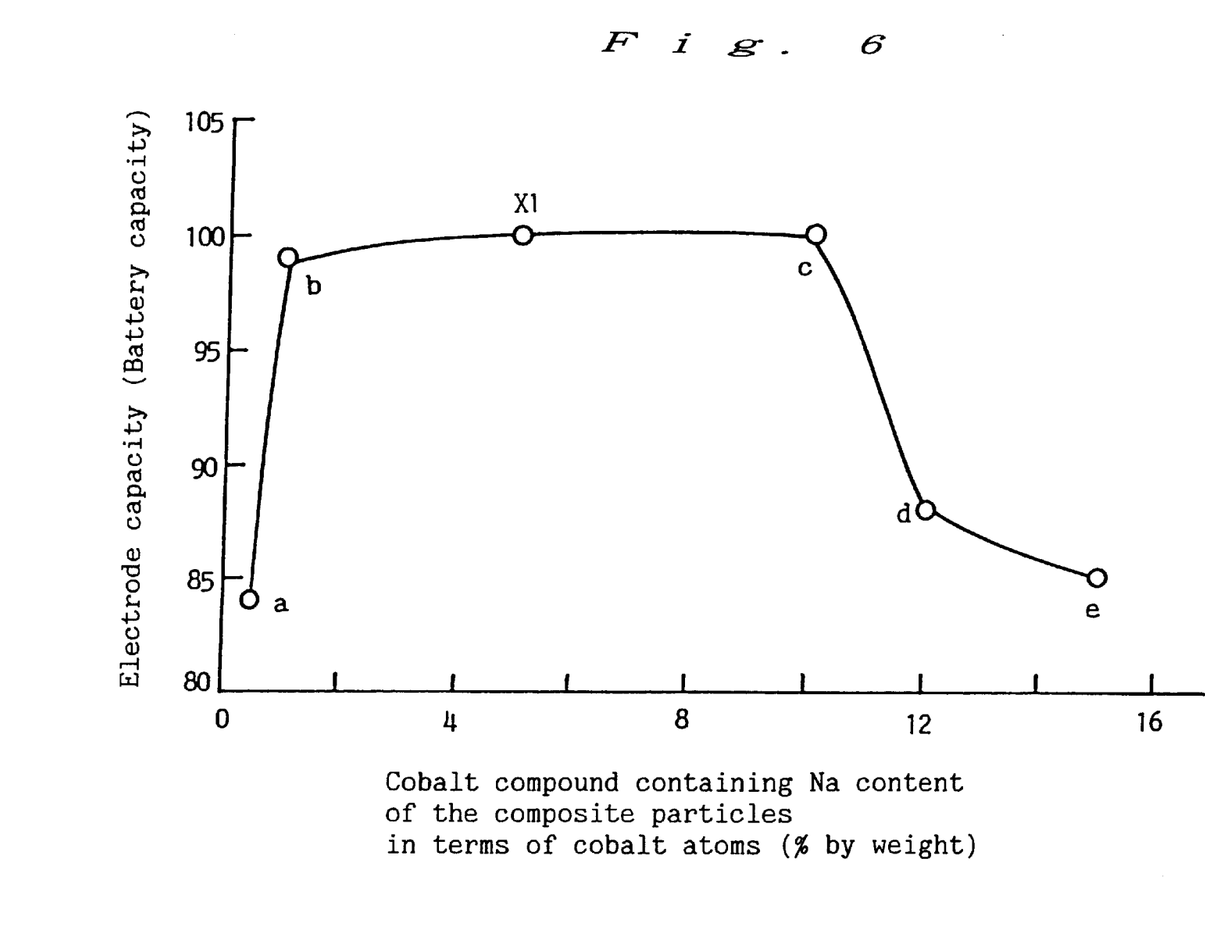
FIG. 6 is a curve of the electrode capacity of the non-sintered nickel electrode plotted against the percentage by weight of the aforesaid cobalt compound contained in the electric conduction layer.

In FIG. 6, the ampere-hours capacity of each battery is plotted on an ordinate against the percentages (by weight) of cobalt compounds contained in the composite particles on an abscissa. In FIG. 6, the ampere-hours capacity of each battery is indicated on the premise that the ampere-hours capacity of an Ni—Cd battery incorporating the second electrode X1 was 100.

FIG. 6 indicates that a drastic decrease in the ampere-hours capacity is encountered when the percentages of cobalt compounds contained in the composite particles are greater than 10% by weight. This may be attributed to the fact that only a small amount of nickel hydroxide used as the active material is available. On the basis of the results given in Table V and FIG. 6, it may be concluded that, in order to obtain a non-sintered nickel electrode having a high electrode capacity and a high utilization of active material, the percentage of a cobalt compound contained in the composite particles should preferably fall within the range between 1 and 10% by weight in terms of cobalt atoms.

Example 8

In this Example, the relationship between the specific electric conductivities κ of the pulverulent active materials and the utilizations of active materials in non-sintered nickel electrodes was sought.

Pulverulent active materials were prepared in a manner similar to the preparation of those which were prepared for the second electrode X1 and the control electrodes Y1 and Y2 except that the cobalt compounds were heated for 1, 2, 4, 6 and 10 hours respectively instead of being heated for 8 hours. The specific electric conductivities κ of these pulverulent active materials were measured by means of the apparatus M under the condition that they underwent a pressure of 400 kgf/cm². Non-sintered nickel electrodes p to w and Ni—Cd batteries incorporating the same were prepared in a manner similar to the preparation of the second electrode X1 except that the aforesaid pulverulent active materials were used. A utilization of active material in each of the non-sintered nickel electrodes was found at the tenth cycle in the same manner as described above. The results are given in Table VI, which also includes data on the Ni—Cd battery incorporating the second electrode X1 (in which the pulverulent active material having a specific electric conductivity of $1\times10^{-4}$ $\Omega^{-1} \cdot cm^{-1}$ was used). In Table VI, the utilizations of active materials in the respective electrodes are indicated on the premise that the value of D found with respect to the second electrode X1 was 100.

TABLE VI

| Non-sintered nickel electrode | Na content (% by weight) | Co compound content (% by weight) | Mean diameter (μm) | Specific electric conductivity ($\Omega^{-1} \cdot cm^{-1}$) | D |
|---|---|---|---|---|---|
| Having NaOH as an additive | | | | | |
| Heated for 1 hr | 0.02 | 5 | 10 | $1 \times 10^{-6}$ | 75 |
| Heated for 2 hrs | 0.06 | 5 | 10 | $5 \times 10^{-6}$ | 80 |
| Heated for 4 hrs | 0.1 | 5 | 10 | $1 \times 10^{-5}$ | 92 |
| Heated for 6 hrs | 0.5 | 5 | 10 | $3 \times 10^{-5}$ | 97 |
| Heated for 8 hrs | 1 | 5 | 10 | $1 \times 10^{-4}$ | 100 |
| Heated for 10 hrs | 1 | 5 | 10 | $1 \times 10^{-4}$ | 100 |
| Having LiOH as an additive | | | | | |
| Heated for 1 hr | 0 | 5 | 10 | $1 \times 10^{-7}$ | 66 |
| Heated for 2 hrs | 0 | 5 | 10 | $5 \times 10^{-7}$ | 70 |
| Heated for 4 hrs | 0 | 5 | 10 | $1 \times 10^{-6}$ | 75 |
| Heated for 6 hrs | 0 | 5 | 10 | $1 \times 10^{-5}$ | 92 |
| Heated for 8 hrs | 0 | 5 | 10 | $1.5 \times 10^{-5}$ | 94 |
| Heated for 10 hrs | 0 | 5 | 10 | $1.5 \times 10^{-5}$ | 94 |
| Having KOH as an additive | | | | | |
| Heated for 1 hr | 0 | 5 | 10 | $5 \times 10^{-7}$ | 70 |
| Heated for 2 hrs | 0 | 5 | 10 | $1.5 \times 10^{-6}$ | 75 |
| Heated for 4 hrs | 0 | 5 | 10 | $5 \times 10^{-6}$ | 80 |
| Heated for 6 hrs | 0 | 5 | 10 | $1 \times 10^{-5}$ | 92 |
| Heated for 8 hrs | 0 | 5 | 10 | $5 \times 10^{-5}$ | 95 |
| Heated for 10 hrs | 0 | 5 | 10 | $6 \times 10^{-5}$ | 95 |

Table VI indicates that, in case of cobalt compounds containing sodium, non-sintered nickel electrodes in which the utilizations of active materials are especially high presuppose that the specific electric conductivity κ is $1\times10^{-5}$ $\Omega^{-1} \cdot cm^{-1}$ or more.

Example 9

In this Example, the relationship between the mean diameters of the pulverulent active material and the electrode capacity of the non-sintered nickel electrodes was sought.

A pulverulent active material having mean diameters of 1, 2. 3, 5, 15, 20, 22 and 25 μm and consisting of grains of nickel hydroxide, each of which was a composite particle having a surface coated with an electric conduction layer consisting of a cobalt compound containing sodium, was prepared in a manner similar to the preparation of the pulverulent active material for the second electrode X1 except that nickel hydroxide powder having various mean diameters was used. Non-sintered nickel electrodes p to w and Ni—Cd batteries incorporating the same were prepared in a manner similar to the preparation of the second electrode X1 except that the aforesaid pulverulent active material was used. The ampere-hours capacity of each battery was measured at the tenth cycle in the same manner as described above. The results are given in Table VII, which also includes data on the Ni—Cd battery incorporating the second electrode X1 (in which the pulverulent active material having a mean diameter of 10 μm was used). In Table VII, the ampere-hours capacity of each battery is indicated on the premise that the ampere-hours capacity of an Ni—Cd battery incorporating the second electrode X1 was 100.

TABLE VII

| Non-sintered nickel electrode | Na content (% by weight) | Co compound content (% by weight) | Mean diameter (μm) | Specific electric conductivity ($\Omega^{-1} \cdot cm^{-1}$) | D | Ampere-hours capacity |
|---|---|---|---|---|---|---|
| p  | 1 | 5 | 1  | $1 \times 10^{-4}$ | 100 | 80 |
| q  | 1 | 5 | 2  | $1 \times 10^{-4}$ | 100 | 85 |
| r  | 1 | 5 | 3  | $1 \times 10^{-4}$ | 100 | 97 |
| s  | 1 | 5 | 5  | $1 \times 10^{-4}$ | 100 | 99 |
| X1 | 1 | 5 | 10 | $1 \times 10^{-4}$ | 100 | 100 |
| t  | 1 | 5 | 15 | $1 \times 10^{-4}$ | 100 | 100 |
| u  | 1 | 5 | 20 | $7.5 \times 10^{-5}$ | 98 | 98 |
| v  | 1 | 5 | 22 | $5 \times 10^{-6}$ | 89 | 89 |
| w  | 1 | 5 | 25 | $6 \times 10^{-6}$ | 87 | 87 |

Table VII indicates that the mean diameter of a pulverulent active material falling within the range between 3 and 20 μm makes it possible to obtain a non-sintered nickel electrode having a high electrode capacity.

From the foregoing, it will be apparent that the conductive agent in accordance with the present invention has a high electric conductivity, that this conductive agent is added to an active material used in the first electrode in accordance with the present invention, resulting in a high utilization of active material, and that the second electrode in accordance with the present invention is adapted to make an active material available in a high degree because the pulverulent active material consists of grains, each of which is coated with an electric conduction layer having a high electric condutivity.

What is claimed is:

1. A non-sintered nickel electrode for alkaline storage batteries with a substrate comprising:

a substrate containing a pulverulent active material in the form of composite particles consisting of grains of nickel hydroxide or grains mainly constituted by nickel hydroxide: and each of said grains having a surface formed with an electric conduction layer consisting of a cobalt compound containing 0.1 to 10% by weight sodium.

2. The non-sintered nickel electrode as defined in claim 1, wherein said composite particles contain 1 to 10% by weight cobalt compound containing sodium, said percentage by weight being expressed in terms of cobalt atoms.

3. The non-sintered nickel electrode as defined in claim 1. wherein said pulverulent active material has a mean diameter of 3 to 20 μm and a specific electric conductivity of $1 \times 10^{-5}$ $\Omega^{-1} \cdot cm^{-1}$ or more under the condition that a pressure of 400 kgf/cm² is applied thereto.

4. The non-sintered nickel electrode as defined in claim 1, wherein said grains mainly constituted by nickel hydroxide take the form of a solid solution of a foreign element or elements in nickel hydroxide, said foreign element or elements being at least one selected from the group consisting of cobalt, zinc, cadmium, calcium, manganese and magnesium.

5. The non-sintered nickel electrode as defined in claim 1, wherein said pulverulent active material is produced by adding an aqueous solution of sodium hydroxide to composite particles consisting of grains of nickel hydroxide or grains mainly constituted by nickel hydroxide, each of which has a surface formed with a cobalt layer or a cobalt compound layer, and by heating the mixture to 50 to 200° C.

6. The non-sintered nickel electrode as defined in claim 5, wherein it takes 0.5 to 10 hours for said pulverulent active material to be heated for production.

7. The non-sintered nickel electrode as defined in claim 5, wherein said cobalt compound layer is made up of cobalt hydroxide.

8. The non-sintered nickel electrode as defined in claim 5, wherein said cobalt compound layer is made up of cobalt oxide.

9. The non-sintered nickel electrode as defined in claim 5, wherein said cobalt compound layer is formed either by pouring nickel hydroxide powder or by pouring particulate matter mainly constituted by nickel hydroxide into an aqueous solution of cobalt sulfate, by adding an aqueous solution of sodium hydroxide, and by precipitating a cobalt compound on surfaces of grains of nickel hydroxide or grains mainly constituted by nickel hydroxide.

10. The non-sintered nickel electrode as defined in claim 5, wherein said cobalt compound layer is formed, by a mechanical charging method, on surfaces of nickel hydroxide powder or particulate matter mainly constituted by nickel hydroxide, said method being characterized in that cobalt oxide powder or cobalt hydroxide powder is fluxed with said nickel hydroxide powder or said particulate matter mainly constituted by nickel hydroxide.

11. The non-sintered nickel electrode as defined in claim 5, wherein said cobalt layer is formed, by a mechanical charging method, on surfaces of nickel hydroxide powder or particulate matter mainly constituted by nickel hydroxide, said method being characterized in that cobalt powder is fluxed with said nickel hydroxide powder or said particulate matter mainly constituted by nickel hydroxide.

* * * * *